United States Patent [19]

Suzuki

[11] Patent Number: 4,468,579
[45] Date of Patent: Aug. 28, 1984

[54] SMALL MOTOR

[75] Inventor: Tadashi Suzuki, Kakuda, Japan

[73] Assignee: Alps Electric Co., Ltd., Tokyo, Japan

[21] Appl. No.: 420,093

[22] Filed: Sep. 20, 1982

[30] Foreign Application Priority Data

Sep. 18, 1981 [JP] Japan .......................... 56-138695[U]

[51] Int. Cl.³ .............................................. H02K 3/04
[52] U.S. Cl. ............................ 310/208; 310/40 MM;
310/71; 310/268; 336/192
[58] Field of Search ................... 310/40 MM, 71, 234,
310/154, 198–208, 268, 162, 163, 164, 42;
336/192

[56] References Cited

U.S. PATENT DOCUMENTS

| Re. 30,761 | 10/1981 | Ban et al. | 318/439 |
| 3,790,835 | 2/1974 | Takeda | 310/268 |
| 4,203,048 | 5/1980 | Sato | 310/268 |
| 4,374,336 | 2/1983 | Shimizu | 310/40 MM |
| 4,398,112 | 8/1983 | Van Gils | 310/207 |

FOREIGN PATENT DOCUMENTS 147934 11/1980 Japan .................................. 310/198

Primary Examiner—R. Skudy
Attorney, Agent, or Firm—Guy W. Shoup; Gerard F. Dunne

[57] ABSTRACT

A small motor has a substantially disc-shaped rotor body carried by a rotor shaft and provided with a plurality of coils, a substantially doughnut-shaped permanent magnet disposed in close proximity of one side face of the rotor body, and a commutator mounted on the part of the rotor shaft in the aperture of the permanent magnet. The part of each coil adjacent to the commutator is bent away from the stationary magnet to provide a recess through which the coil end can be led to increase the effective length of the coil to increase the torque without increasing the distance between the stationary magnet and the rotor body or significantly increasing the dimensions of the motor as a whole.

1 Claim, 4 Drawing Figures

SMALL MOTOR

BACKGROUND OF THE INVENTION

The present invention relates to a small motor and, more particularly, to a small motor having a commutator disposed in the aperture of a doughnut-shaped stationary magnet.

In general, the torque T acting on the rotor of a small motor is given by the following formula:

$$T = B \cdot i \cdot l$$

(where B represents the magnetic flux density of the stationary magnet, i represents the electric current in the coil and l represents the effective length of the coil perpendicular to the magnetic flux and the direction of rotation)

Therefore, the torque T can be increased by increasing one or more of the magnetic flux density B, current i and the coil effective length l. To increase the torque by increasing the effective length l, it may be considered to increase the diameter of the rotor as a whole or to make efficient use of a normally unutilized portion of the effective part of the coil adjacent to the commutator.

However, the former method increases the size of the motor as a whole. The latter method can be done, as shown in FIG. 1, by decreasing the inside diameter of a doughnut-shaped stationary magnet 7' from $R_1$ to $R_2$ to increase the effective length from $l_1$ to $l_2$ of the coil 6' so that the entire part of the effective length of the coil 6' is crossed by the magnetic flux. In this case, however, it is necessary to increase the distance between the stationary magnet and the coil because the end 6a' of the coil 6' undesirably contacts the stationary magnet 7' as a result of the reduction in the inside diameter of the magnet. Consequently, the magnetic flux density B is decreased, reducing and the torque cannot be sufficiently increased. In order to compensate for the reduction in the magnetic flux density B, is is possible to increase the wall thickness of the stationary magnet, but this increases the size of the motor as a whole.

SUMMARY OF THE INVENTION

Accordingly, in consideration of the above drawbacks, the object of the invention is to provide a small motor in which the coil effective length is increased without reducing the magnetic flux density and current to increase the torque of the motor.

According to the present invention, a small motor with a substantially disc-shaped rotor body carrying a plurality of coils is modified by the portion of each coil adjacent to the comutator being bent away from the stationary magnet.

The above and other objects, features and advantages of the invention will become clear from the following description of the preferred embodiment taken in conjunction with the accompanying drawings.

DESCRIPTION OF THE PREFERRED EMBODIMENT

Figure 1:
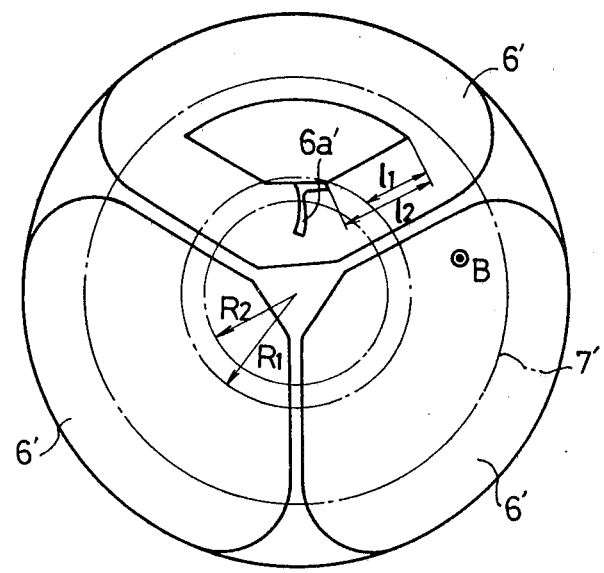
FIG. 1 is a front elevational view of a conventional motor showing the relationship between the stationary magnet and the coil.
Figure 2:
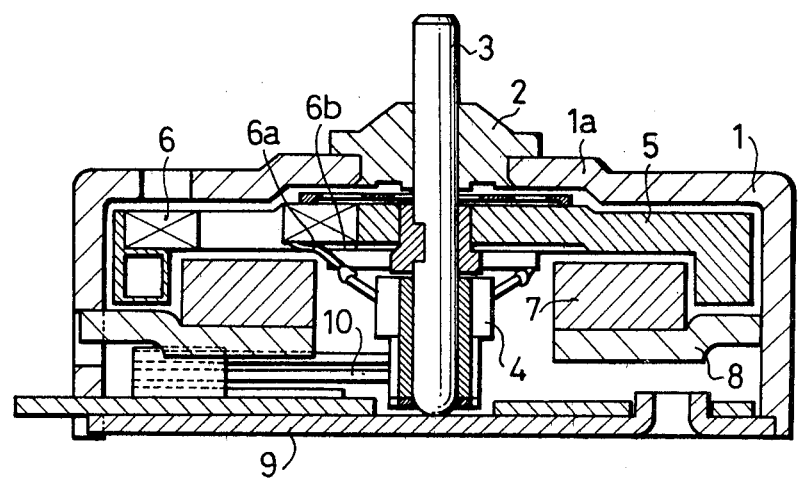
FIG. 2 is a sectional side elevational view of a small motor in accordance with an embodiment of the invention.
Figure 3:
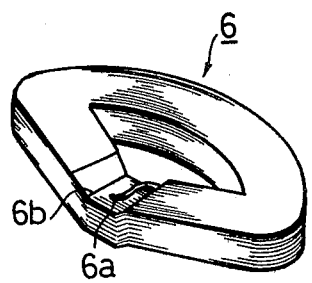
FIG. 3 is a perspective view of the bottom of the coil incorporated in the small motor shown in FIG. 2.

A preferred embodiment of the invention will be now described with reference to FIGS. 2 to 4.

In these Figures, a small motor in accordance with an embodiment of the invention has a flat cylindrical case 1. The upper end opening of the case 1 is closed by a top plate with a bearing 2 mounted at its center. A rotor shaft 3 is rotatably supported by the bearing 2, and a commutator 4 is fixed to the rotor shaft 3. Reference numeral 5 denotes a rotor body fixed to the portion of the rotor shaft 3 between the bearing 2 and the commutator 4. The rotor body 5 is made from a synthetic resin in a disc-like form. Three coils 6 are embedded in the rotor body 5 at a regular angular intervals. Each coil 6 has an axis extending parallel to the axis of the rotor shaft 3. The portion of the coils 6 adjacent to the commutator 4 is bent away from a later-mentioned stationary magnet or the commutator 4 to provide a recess 6b through which the coil end 6a is led. An outward step 1a is formed on the case 1 corresponding to the recess 6b. Reference numeral 7 denotes a stationary magnet fixed to and supported by a bracket 8. The inside diameter of the magnet 7 is formed such that the magnet 7 covers the entire effective length of the coil 6. Reference numeral 9 denotes a lid plate covering the opening of the case 1. A pair of contact terminals 10 are secured to the inner surface of the lid plate 9 opposite each other in contact with the commutator 4. The inner surface of the lid plate 9 is in contact with the end of the rotor shaft 3.

Figure 4:
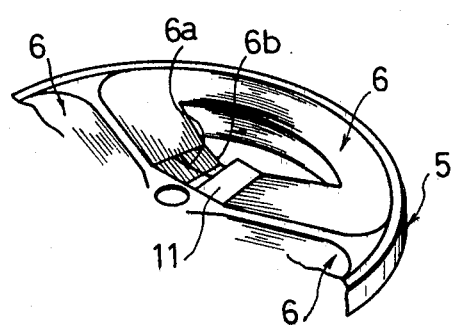
FIG. 4 is a perspective view of a modification of the rotor of the motor shown in FIG. 2.

FIG. 4 shows another embodiment in which a synthetic resin 11 is charged into the recess 6b of the coil 6 provided in the rotor body 5 and the coil end 6a is thereby fixed in position.

The present invention is constructed as described above and has the following operation: the effective length of the coil 6 is covered by the stationary magnet 7 and the magnetic flux crosses the effective length of each coil and so the torque is large. In addition, it is possible to lead the end 6a of the coil through the recess 6b and connect it to the commutator 4.

As has been described, according to the invention, there is provided a small motor having a substantially disc-shaped rotor body provided with a plurality of coils adapted to produce a torque for rotating the rotor body in cooperation with the magnetic flux produced by the stationary magnet, the portion of each coil adjacent to the commutator being bent away from the stationary magnet to provide a recess through which the end of the coil can be led for connection to the commutator. It is therefore possible to increase the effective coil length to increase the torque without increasing the distance between the stationary magnet and the rotor body. Since the shape of the coil is only partially changed, the thickness of the case is increased locally but is not substantially increased as a whole. It is also possible to effectively fix the end of the coil by charging synthetic resin into the recess through which the coil end is led to be connected to the commutator.

Although the invention has been described through a specific embodiment, it should be noted that the described embodiment is not exclusive, and various changes and modifications are possible without departing from the scope of the appended claim.

What is claimed is:

1. In a small motor having a substantially disc-shaped rotor body carried by a rotor shaft and provided with a plurality of coils, a substantially doughnut-shaped stationary magnet disposed in the vicinity of one side face of said rotor body, and a commutator mounted on the portion of said rotor shaft located in the aperture of said stationary magnet: the improvement comprising that a portion of each coil adjacent to said commutator is bent so as to extend away from said stationary magnet to provide a recess receiving the end of the coil adapted to be connected to said commutator.

* * * * *